United States Patent [19]

Nakajima

[11] 4,449,111
[45] May 15, 1984

[54] TRANSFORMER

[75] Inventor: Tomoo Nakajima, Omiya, Japan

[73] Assignee: Tamura Seisakusho Co., Ltd., Tokyo, Japan

[21] Appl. No.: 349,260

[22] Filed: Feb. 16, 1982

[30] Foreign Application Priority Data

Jul. 17, 1981 [JP] Japan ................................ 56-107079

[51] Int. Cl.³ ............................................. H01F 27/30
[52] U.S. Cl. .................................. 336/206; 336/84 C; 336/198; 336/205
[58] Field of Search .............. 336/206, 205, 198, 84 C

[56] References Cited

U.S. PATENT DOCUMENTS 3,071,845  1/1963  Leonard et al. ................ 336/206 X
4,095,205  6/1978  Schroeder et al. ............. 336/206 X

FOREIGN PATENT DOCUMENTS 668021  8/1963  Canada ................................ 336/198
402425  10/1924 Fed. Rep. of Germany .
1235215  5/1960  France ............................... 336/84 C
94850   1/1973  German Democratic Rep. .
329669   5/1930  United Kingdom .
1360993  7/1974  United Kingdom .

Primary Examiner—J. V. Truhe
Assistant Examiner—S. Steward
Attorney, Agent, or Firm—Leydig, Voit, Osann, Mayer and Holt, Ltd.

[57] ABSTRACT

A transformer has an insulator interposed between respective primary and secondary coils wound on a coil bobbin which has an axial winding part and opposing radially extending flanges. The insulator is made from a continuous sheet of material which is corrugated to provide an insulating base having a width larger than the width of the winding part of the coil bobbin and from a continuous, plastic insulating sheet member having substantially the same width as the winding part. The corrugated insulated base material and insulating sheet member are wound between the primary coil and the secondary coil and the corrugated insulating base is bent at both side edges to be L-shaped to intimately fit to the inner surface of the flanges of the coil bobbin so as to provide an insulator which positively prevents coil wire at each end portion of the coil from dropping out of alignment with respective coil turns.

4 Claims, 13 Drawing Figures

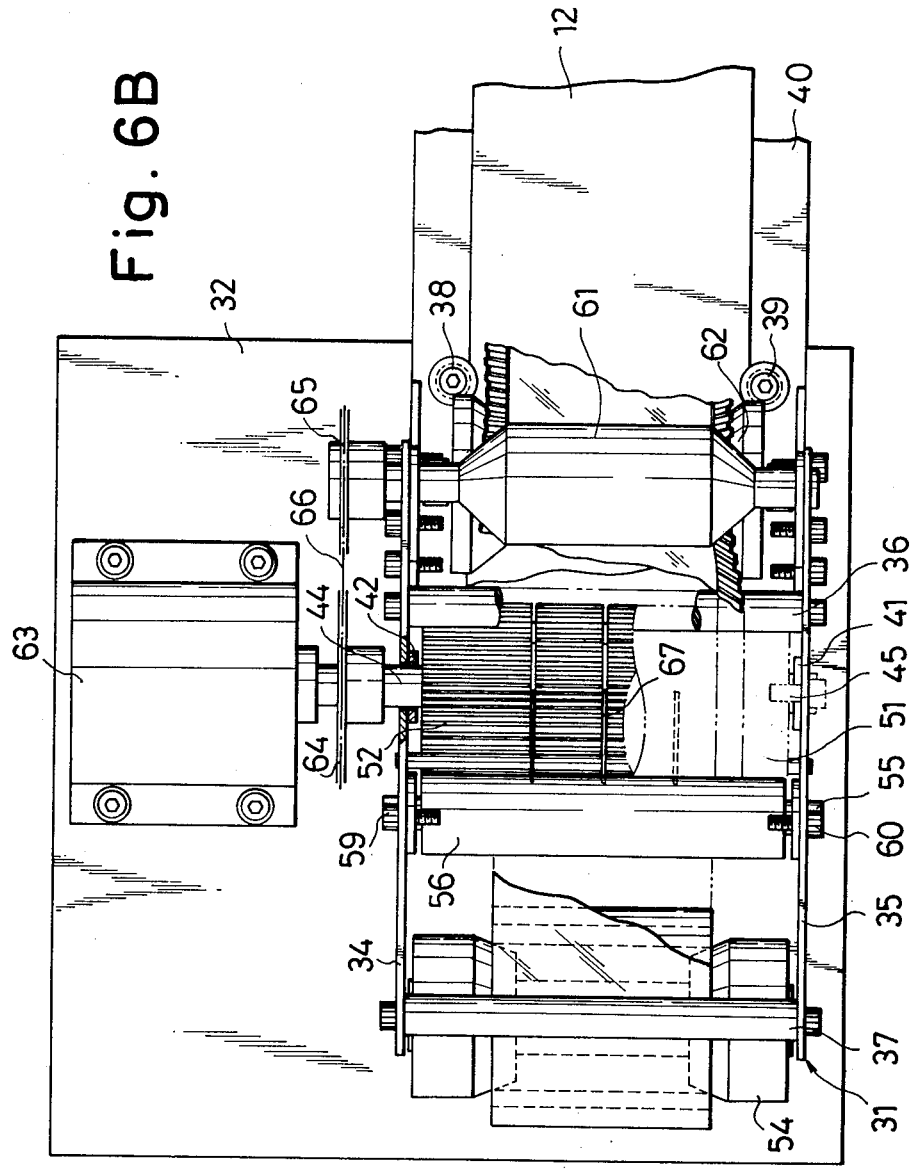

TRANSFORMER

This invention relates generally to transformers and, more particularly, to improvements in transformers wherein an insulator easy to make and having a sufficient strength is interposed between primary and secondary coils.

Generally, it is necessary for transformers to have positive insulation with sufficient dielectric strength between coils. In the case of transformers wherein thin insulating paper sheet is positioned between the primary and secondary coils, there have been defects that, though the insulating paper is easy to make, part of the secondary coil on both side edges of the paper has been likely to drop on the primary coil side and insufficient dielectric strength has been obtained.

On the other hand, there has been suggested transformer wherein, in order to eliminate these defects, an insulating frame molded of a plastic so as to be divided into two parts which can be fitted to each other is positioned between the primary coil and the secondary coil. While in this transformer the secondary coil can be positively prevented from dropping on the primary coil side, die to be used for the injection-molding of the insulating frame has had to be prepared separately for each different type of transformer; the manufacture thus has been complicated and the cost has been high.

A primary object of the present invention is, therefore, to provide transformer which can be very easily manufactured and assures sufficient dielectric strength between coils.

Another object of the present invention is to provide transformer employing very effective insulator made by adhering an insulating member made of a plastic film on corrugated insulating base and which is not required to be separately prepared for each different type of transformer.

A further object of the present invention is to provide transformer wherein corrugated insulating base of an insulator is made wider than the coil winding width and bent at both side edges to be L-shaped to intimately fit to the flanges of the coil bobbin to be able to positively prevent any displacement of the secondary coil to the primary coil side.

Another object of the present invention is to provide transformer wherein the primary and secondary coils are positively insulated from each other by means of an inexpensive member which still assures the safety of the transformer.

A further object of the present invention is to provide transformer wherein an insulating base for strengthening the insulator is corrugated to have plurality of corrugations that can provide to the insulator an extensibility sufficient to absorb tensile force applied to the insulator when bent at its edges and wound on the primary coil, so that the insulator is easy to wind, favorable to use and may be mass produced.

Other objects and advantages of the present invention will become apparent from the following descriptions of preferred embodiment detailed with reference to accompanying drawings, in which:

FIGS. 4A, 4B and 4C show steps of manufacturing the transformer according to the present invention, wherein FIG. 4A is a view showing the primary coil wound on a coil bobbin, FIG. 4B showing the insulator of FIG. 3B being wound on the primary coil, and FIG. 4C showing the secondary coil being wound on the insulator positioned on the primary coil;

FIG. 6B is a plan view with parts in section of the insulator manufacturing apparatus shown in FIG. 6A.

Figure 1A:
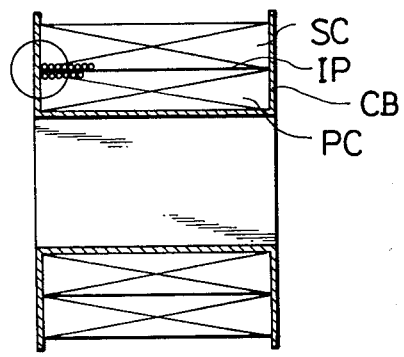
FIG. 1A is a sectional view of a transformer using conventional thin insulating paper.

While the present invention shall now be explained with reference to the preferred embodiment shown in the drawings, the intention is not to limit the present invention to the particular embodiment shown but is to rather include all modifications, alterations and equivalent arrangements possible within the scope of the appended claims.

Figure 1B:
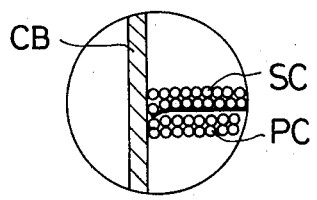
FIG. 1B is a fragmentary sectional view as magnified for showing defective state of the transformer shown in FIG. 1A.

Prior to the description of the present invention, conventional transformers shall be first referred to for better understanding of the present invention. The transformer of FIGS. 1A and 1B is formed by winding the primary coil PC on the winding part of a coil bobbin CB and further winding the secondary coil SC after interposing an insulating paper IP between them. In this transformer, the insulating paper IP will be pushed down at the side edge to the primary coil PC side by the component wire, for example, on the side of the lowermost layer of the secondary coil SC wound on the insulating paper, and so-called wire drop will occur. Therefore, some gap will be produced between the inner surface of a flange of the coil bobbin and the side edge of the insulating paper IP, the component wire on the side of the lowermost layer of the secondary coil SC and that on the side edge of the primary coil PC will be present adjacent each other substantially through no insulating paper IP and the dielectric strength of the transformer will become low.

Figure 2A:
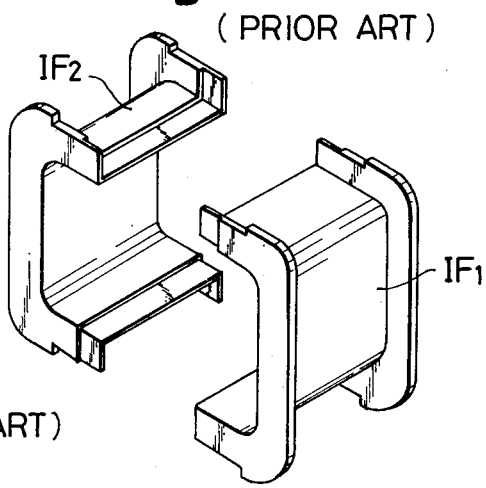
FIG. 2A is a perspective view as disassembled of conventional plastic insulating frame formed into two halves.
Figure 2B:
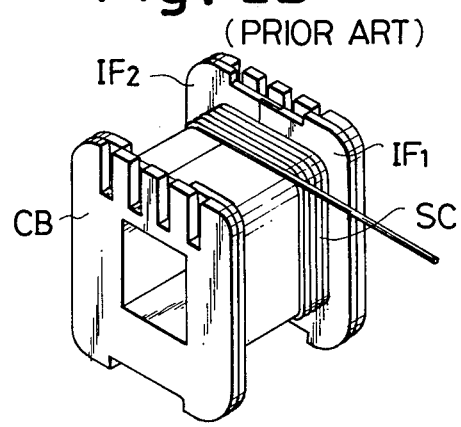
FIG. 2B is a perspective view for showing manufacture of a transformer using the plastic insulating frame of FIG 2A.
Figure 2C:
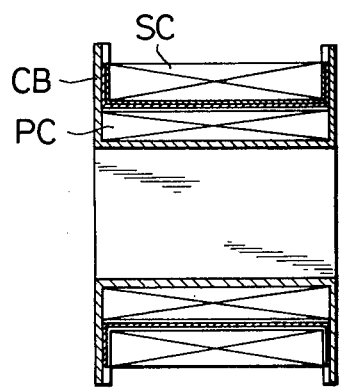
FIG. 2C is a sectional view of the transformer using the plastic insulating frame of FIG. 2A.

On the other hand, the transformer of FIGS. 2A to 2C is formed by winding the primary coil PC on the winding part of the coil bobbin CB, placing two divided insulating frames $IF_1$ and $IF_2$ fittable to each other on the primary coil PC and winding the secondary coil SC on the thus fitted insulating frames $IF_1$ and $IF_2$. In this transformer, the insulation between the respective primary and secondary coils PC and SC will not be likely to be impaired but the insulating frames $IF_1$ and $IF_2$ will have to be prepared dependent on the type and size of the transformer. In other words, there are defects that various kinds of dies for use in injection-molding the insulating frames will have to be made, the manufacture will be complicated, the cost of making the dies will be high and the total manufacturing cost will increase.

Figure 3A:
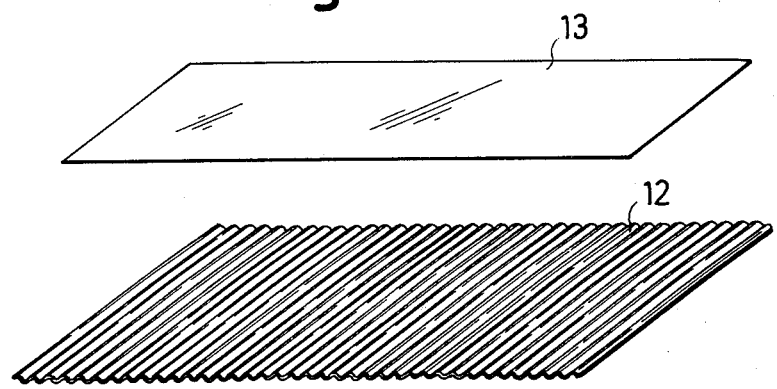
FIG. 3A is a perspective view as disassembled of an insulator according to the present invention and comprising an insulating base and an insulating member made of plastic film.
Figure 3B:
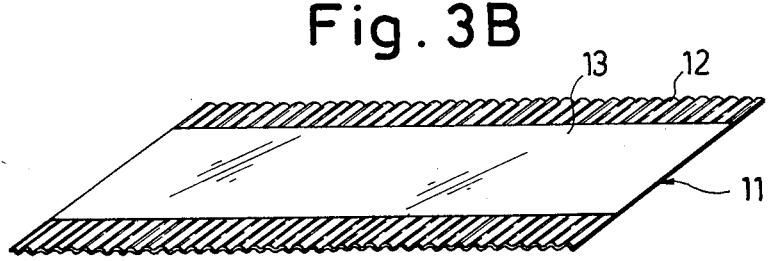
FIG. 3B is a perspective view as assembled of the insulator of FIG. 3A with the plastic insulating member fitted to the insulating base.

The present invention is suggested to solve these various problems. With reference to FIGS. 3A and 3B, according to a remarkable feature of the present invention, an insulator 11 wound between the primary and secondary coils of the transformer comprises corrugated insulating base 12 and sufficiently soft plastic insulating member 13 adhered onto the base 12. Generally, this insulating base 12 is of greater strength than member 13 and is made of such paper material of a thickness of about 0.5 to 0.7 mm as a pressed board or aromatic polyamide paper of, for example, trade name "Nomex Paper" manufactured by DuPont and is corrugated by the later described apparatus so as to have plurality of elevations parallel with each other at a proper pitch. On the other hand, the plastic insulating member 13 is made of such plastic film of a thickness of about 0.1 to 0.2 mm as, for example, a polyethylene terephthalate film and is adhered to one side of the insulating base preferably with such adhesive as an acrylic resin.

Figure 4A:
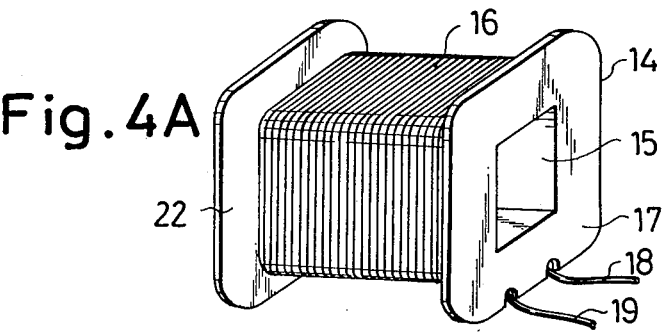
Figure 4B:
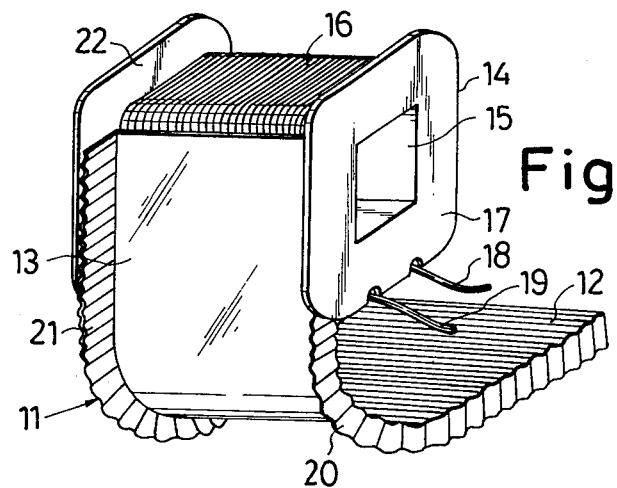
Figure 4C:
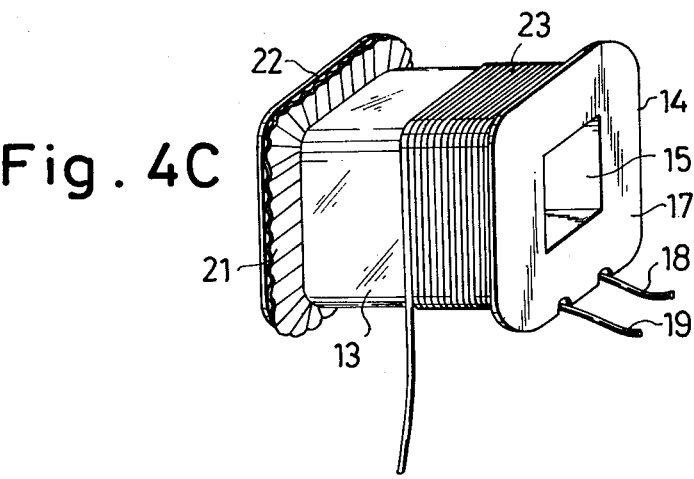

Further, particularly with reference to FIGS. 4B and 4C, the plastic insulating member 13 has substantially the same width as the width of coil winding part 15 of a coil bobbin 14, that is, the winding width of the coil wound on this winding part 15. On the other hand, the insulating base 12 is made wider than the plastic insulating member 13, that is, wider than the width of the winding part 15 of the coil bobbin 14 and its width is so selected that, when the insulating member 13 is adhered onto the insulating base 12, each side edge of the base will extend in the width direction beyond the plastic insulating member 132.

Figure 5:
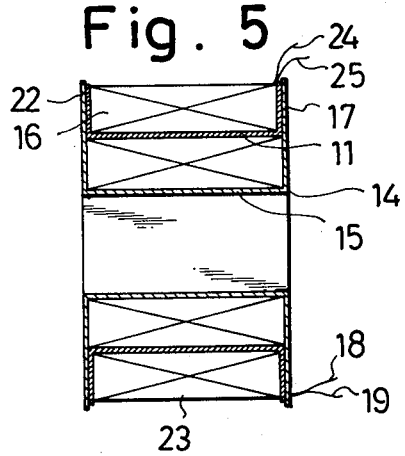
FIG. 5 is a sectional view of the transformer manufactured through the steps of FIG. 4A to 4C.

Further, the steps of manufacturing a transformer provided with this characteristic insulator according to the present invention shall be explained. First of all, as shown in FIG. 4A, a primary coil 16 is wound on the winding part 15 of the coil bobbin 14 while leading both ends 18 and 19 of the coil out of a flange 17 of the coil bobbin 14. Then, as shown in FIG. 4B, the insulator 11 made by adhering the plastic insulating member 13 onto the insulating base 12 is wound around the primary coil 16 so that many of the elevations parallel with each other of the insulating base will extend in the direction vertical to the winding direction. At this time, the insulating base 12 is bent at both sides 20 and 21 substantially at right angles with respect to the member 13 and radially along both end flanges 17 and 22 of the coil bobbin 14. Then, as shown in FIG. 4C, a secondary coil 23 is wound above the insulator 11 on the bobbin while leading both ends 24 and 25 of the coil 23 out of the bobbin to complete the transformer according to the present invention, as shown in FIG. 5.

In this case, even if the insulator 11 is subjected to a pressure due to the coil wire wound in the lowermost layer of the secondary coil 23 specifically at the respective side edges of the member 13, the respective sides 20 and 21 of the insulating base 12 bent vertically along the flanges 17 and 22 of the coil bobbin 14 will effectively prevent any gap from being produced between the side edges of the insulator 11 and the coil bobbin 14 and a sufficient dielectric strength can be assured.

Figure 6A:
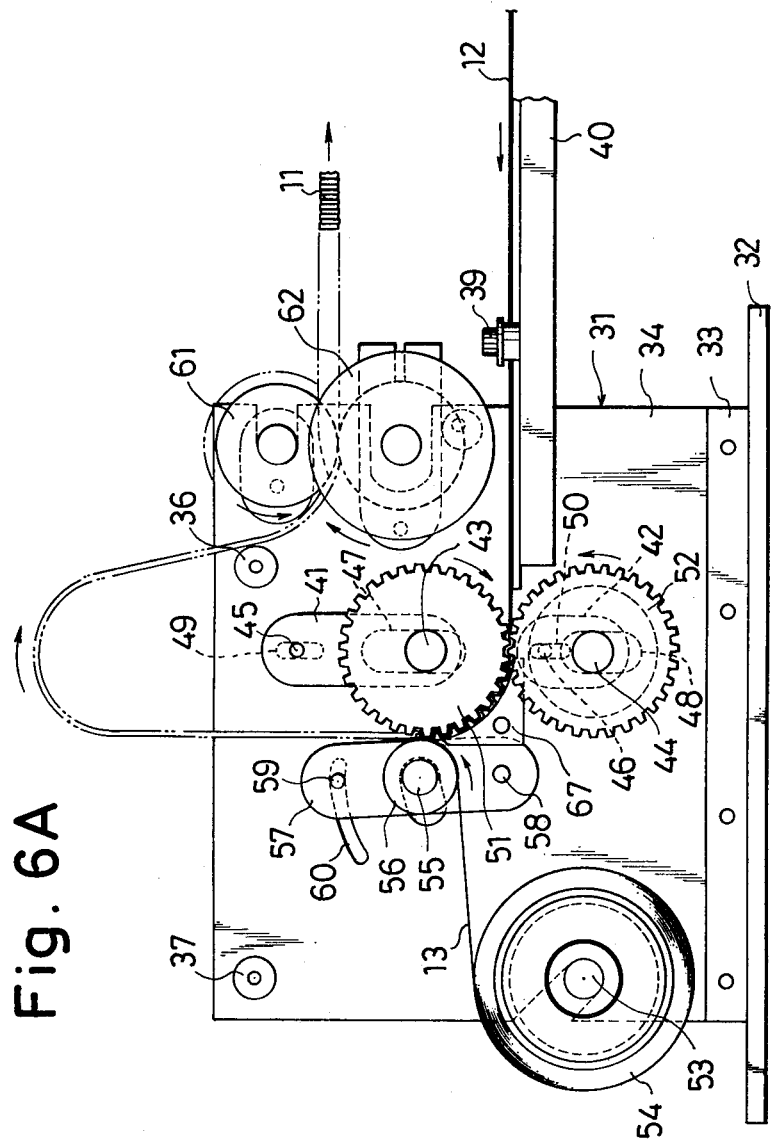
FIG. 6A is a schematic side view of an apparatus for manufacturing insulators to be used for transformers of the present invention, with one fitting plate removed.

In addition, an example of an apparatus and method for manufacturing the insulator 11 of the transformer according to the present invention shall be described. Referring to FIGS. 6A and 6B, the apparatus for manufacturing the insulator 11 includes a frame 31 which is formed by tightly securing to a base 32 a pair of fitting plates 34 and 35 as separated from each other through a reinforcing member 33 and transverse bar members 36 and 37 as separated from each other to the upper parts of the fitting plates 34 and 35. A feeding station 40 is secured horizontally to one side of the frame 31 to extend out of the same substantially over one half of the length of the station and guide rolls 38 and 39 are provided on this station. Adjusting plates 41 and 42 are fitted substantially to the middle of the frame 31 inside thereof so as to be positioned adjacent to and above and below the inner end of the feeding station 40 (only one side of the fitting plate 34 is shown in FIG. 6A). In these adjusting plates 41 and 42, roll shafts 43 and 44 are fitted, threaded parts of set screws 45 and 46 are screwed and the roll shafts 43 and 44 as well as the threaded parts of the set screws 45 and 46 are inserted respectively through slots 47, 48 and 49, 50 made to extend in the vertical direction in the fitting plate 34. Corrugating rolls 51 and 52 having corrugated or gear-shaped peripheral surfaces as seen from the side are secured respectively to the roll shafts 43 and 44. The corrugated surfaces of the rolls 51 and 52 are so arranged as to mesh with each other in the plane including the upper surface of the feeding station 40. This arrangement is realized by properly moving the roll shafts 43 and 44 of the corrugating rolls 51 and 52 and the threaded parts of the set screws 45 and 46 respectively within the slots 47, 48, 49 and 50 and fastening the set screws 45 and 46 to the fitting plate 34 in the position in which the corrugated surfaces of the corrugating rolls 51 and 52 mesh with each other in the plane including the upper surface of the feeding station 40. While the arrangement of the adjusting plates, set screws and slots has been described only on the side of the fitting plate 34, it will be easily understood by one skilled in the art that the same arrangement is taken also on the other fitting plate 35.

On the other hand, a roll 54 for feeding the plastic insulating member 13 is supported at its shaft 53 between the fitting plates 34 and 35 on the other side of the frame 31 and the plastic insulating member 13 is wound on this roll 54. A pressing roll 56 secured to a roll shaft 55 is arranged on the side opposite the feeding station 40 of the upper corrugating roll 51. Such rubber member as, for example, a sponge member is fitted to the periphery of the pressing roll 56 so that the roll 56 will have a sufficient elasticity. The roll shaft 55 is fitted to the adjusting plate 57 (only one side of the fitting plate 34 is shown in FIG. 6A) which is provided rockably, with a supporting shaft 58 secured to the fitting plate 34 as a fulcrum. A set screw 59 is provided to the adjusting plate 57, while threaded part of the set screw 59 is inserted through an arcuate slot 60 of the fitting plate 34 so that, when the set screw 59 is fastened to the plate 34 within the range of the arcuate slot 60, the adjusting plate 57 will be able to be fixed at desired pivoted position. This arrangement of the adjusting plate, set screw and arcuate slot have been described only on the side of the fitting plate 34, but it will be understood that the same arrangement can be taken also on the other side of the fitting plate 35. The pressing roll 56 can be thus arranged so as to exert any desired pressing force against the upper corrugating roll 51.

Further, a pair of shaping rolls 61 and 62 are arranged above the feeding station 40 on the first mentioned one side of the frame 31. The upper shaping roll 61 is made of an elastic roll and the lower holding roll 62 is made of a rigid roll. Axial end portions of the both shaping rolls 61 and 62 are formed to have tapered surfaces complementary to each other.

In addition, in the above described insulator manufacturing apparatus, the upper corrugating roll 51 is provided to be rotated as driven by a motor 63 set on the frame 31 and the upper shaping roll 61 is formed to be operatively connected with the corrugating roll 51 through sprockets 64 and 65 and a chain 66 so that, when the upper corrugating roll 51 is driven, the lower corrugating roll 52 meshing with it, the pressing roll 56 contacting the upper corrugating roll 51, the upper shaping roll 61 and the lower shaping roll 62 cooperating with the upper shaping roll 61 will be driven.

The method of manufacturing the insulator 11 by the apparatus shown in FIGS. 6A and 6B shall be explained in the followings. Now, when the motor 63 is driven, the respective rolls are set in rotating states and the insulating base 12 in the form of an ordinary paper material is then introduced in the horizontal direction along the feeding station 40 and is further introduced at the front end of the material between the corrugating rolls 51 and 52, the insulating base 12 corrugated as desired on the corrugated surfaces of the corrugating rolls 51 and 52 will move upward along the peripheral surface of the upper corrugating roll 51 while being guided preferably by a plurality of guides 67.

On the other hand, the insulating member 13 is paid out of the roll 54 and is inserted, together with the corrugated insulating base 12, between the upper corrugating roll 51 and the pressing roll 56. At this time, the insulating member 13 may be such adhesive tape that an adhesive of acrylic resin is applied preliminarily onto one surface of a plastic sheet to be contacted with the insulating base 12, or may be the one on the said contacted surface with the adhesive applied immediately before contacting the insulating base 12 after being pulled out of the roll 54 which is automatically driven and rotated together with the corrugating rolls 51 and pressing roll 56 as the insulating member 13 is inserted between the upper corrugating roll 51 and the pressing roll 56 and is tensioned together with the insulating base 12.

The insulating base 12 to which the insulating member 13 is thus adhered is further introduced between the shaping rolls 61 and 62 to have the insulating member 13 sufficiently joined to it, the side portions extending in the width direction out of the insulating member 13, that is, the side portions extending beyond the winding part of the coil bobbin (as is best seen in FIG. 3B) are then caused to be inclined upward by the both end tapered portions of the shaping rolls 61 and 62 and the thus joined base 12 and member 13 are led out of the shaping rolls 61 and 62 to complete the insulator 11. Thereafter, the insulator 11 is cut into desired lengths with a proper cutter (not illustrated).

The arrangement described above with reference to the drawings can be variously modified in the design. While in the illustrated embodiment the primary coil is wound on the coil bobbin inside the insulator and the secondary coil is wound outside the insulator, the secondary coil may be wound inside the insulator and the primary coil may be wound outside the insulator. Further, while the insulating member has been described as a plastic film, any thin film of a paper material impregnated with an insulating agent can be adopted. In addition, the holding roll can be so formed as to make a fold in the insulating base 12 with the insulating member 13 to make it easy to bend the insulating base 12 in each of the side portions 20 and 21.

According to the present invention formed as described above, the insulator can be made of a material less expensive than in a transformer having the same effect without requiring a die or the like and the manufacturing cost can be greatly reduced. Further, as the insulator used in the present invention assures a sufficient strength even in the end portions of the winding part of the coil bobbin, any displacement of the coil wire of the secondary coil with respect to the primary coil, that is, the wire drop will not be caused to occur and a sufficient dielectric strength can be secured. Further, an insulator of the present invention having sufficient mechanical strength can be applied to any kind of transformer in the same manner as the conventional insulating sheet and is, therefore, highly advantageous and transformers high in safety factor can be mass-produced. Particularly, as the insulating base of the insulator is corrugated to have many elevations and has therefore a sufficient extensibility such that tensile force applied to the side edge of the insulating base at the corner portion of the winding part of the coil bobbin can be absorbed, that is, the side edge of the insulating base will extend intimately along the flanges of the coil bobbin. Therefore, the side edges of the insulating base will not turn toward the axial center of the winding part to interfere with or impair the fitting in place of the windings of the secondary coil.

What is claimed is:

1. A transformer comprising a coil bobbin having at both axial ends opposing radially extending flanges and between said flanges an axial winding part, primary and secondary coils wound in superposed relation on said winding part between the flanges of said coil bobbin, and an insulator interposed between said primary and secondary coils, said insulator comprising a corrugated insulating base member wider than said winding part of the bobbin extending completely around said coil bobbin, and an insulating sheet member having substantially the same width as said winding part, said insulating base member having a strength relatively higher than that of said insulating sheet member and corrugated to have a plurality of elevations extending in the direction perpendicular to the coil winding direction to provide extensibility to said insulating base, and having respective side portions of the insulating base bent to extend in the radial direction outwardly adjacent respective side edges of the insulating member along the inner surfaces of both flanges, said corrugated insulating base member and insulating sheet member being formed to extend adjacent each other coaxially of said axial winding part between the flanges of said coil bobbin and between said primary and secondary coils.

2. A transformer according to claim 1 wherein said insulating base is made of a paper material having a predetermined thickness and said insulating member is made of a plastic film.

3. A transformer according to claim 2 wherein said insulating member is adhered onto said insulating base with an acrylic resin adhesive.

4. A transformer according to any one of claims 1 to 3 wherein said side portions extending in the radial direction adjacent the side edges of the insulating member are inclined relative to the portions of said insulating base formed coaxially of said winding part of said bobbin.

* * * * *